(12) United States Patent
Salinger et al.

(10) Patent No.: US 10,050,801 B2
(45) Date of Patent: Aug. 14, 2018

(54) DIGITAL FORWARD LINK IN HYBRID FIBER-COAX NETWORK

(71) Applicant: Comcast Cable Communications, LLC, Philadelphia, PA (US)

(72) Inventors: Jorge Salinger, Littleton, CO (US); John Bevilacqua, Boulder, CO (US); Saifur Rahman, Cinnaminson, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 299 days.

(21) Appl. No.: 14/611,147

(22) Filed: Jan. 30, 2015

(65) Prior Publication Data

US 2015/0222449 A1    Aug. 6, 2015

Related U.S. Application Data

(60) Provisional application No. 62/019,156, filed on Jun. 30, 2014, provisional application No. 61/934,419, filed on Jan. 31, 2014.

(51) Int. Cl.
    *H04L 12/28*    (2006.01)
    *H04L 12/931*   (2013.01)
    *H04L 27/00*    (2006.01)

(52) U.S. Cl.
    CPC ...... *H04L 12/2801* (2013.01); *H04L 27/0002* (2013.01); *H04L 27/0008* (2013.01); *H04L 49/351* (2013.01); *H04L 49/357* (2013.01)

(58) Field of Classification Search
    CPC ..... H04L 49/30; H04L 49/40; H04L 12/2801; H04L 12/2803; H04J 3/22; H04J 3/16; H04W 4/06

USPC .......................................... 370/419, 480, 465
    See application file for complete search history.

(56) References Cited

U.S. PATENT DOCUMENTS

| | | | | |
|---|---|---|---|---|
| 6,725,281 B1 * | 4/2004 | Zintel | ................ | H04L 12/2803 709/217 |
| 6,948,088 B1 * | 9/2005 | Sharan | ................ | H04L 12/2801 714/6.31 |
| 2005/0265394 A1 * | 12/2005 | Chapman | ............ | H04L 12/2801 370/480 |
| 2006/0168612 A1 * | 7/2006 | Chapman | ............ | G06F 11/0709 725/11 |
| 2009/0049492 A1 | 2/2009 | Pantelias | | |
| 2010/0191813 A1 * | 7/2010 | Gandhewar | ......... | H04L 61/2015 709/206 |
| 2012/0099494 A1 * | 4/2012 | Salinger | .................. | H04W 4/06 370/310 |

* cited by examiner

*Primary Examiner* — Chi H Pham
*Assistant Examiner* — Alexander O Boakye
(74) *Attorney, Agent, or Firm* — Banner & Witcoff, Ltd.

(57) ABSTRACT

A hybrid fiber-coax network may replace an analog forward link with a digital optical forward link between a converged cable-access platform (CCAP) and node, which may allow for improved data-throughput rates on the network. Replacing the analog forward link with the digital optical forward link may allow for a greater distance between a headend and the node. Further, the digital optical forward link may improve link modulation error ratio (MER), which, when combined with advanced headend equipment, may enable a cable modem to support the high-order modulation profiles (e.g., profiles included in DOCSIS 3.1).

20 Claims, 14 Drawing Sheets

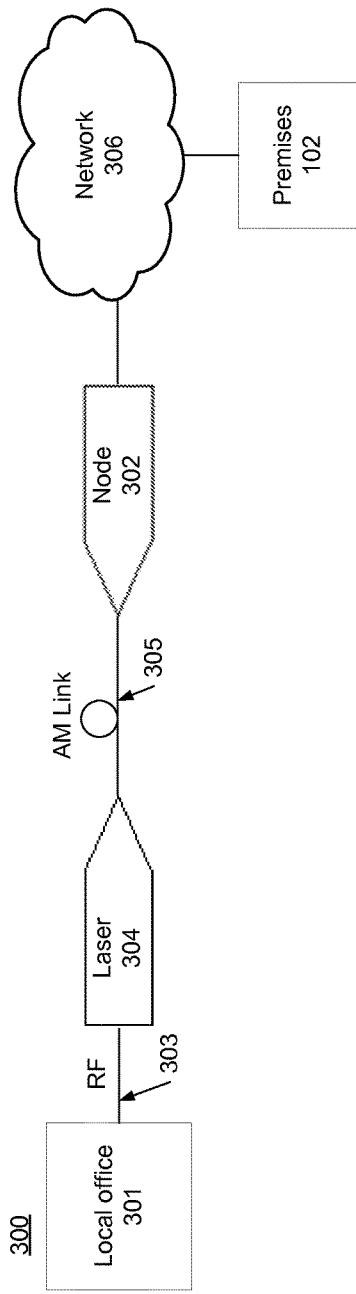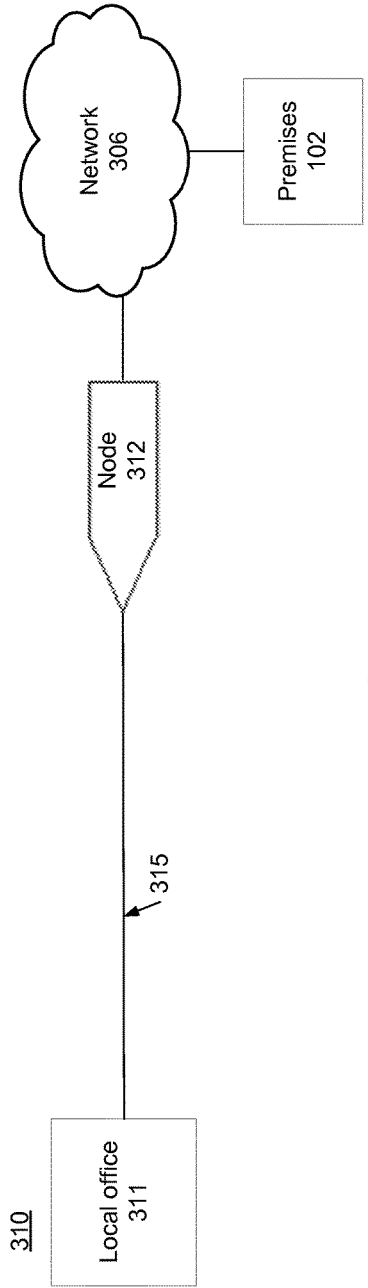

DIGITAL FORWARD LINK IN HYBRID FIBER-COAX NETWORK

CROSS REFERENCE TO RELATED APPLICATIONS

This application claims the benefit of U.S. Provisional Application No. 61/934,419, filed Jan. 31, 2014, and U.S. Provisional Application No. 62/019,156, filed Jun. 30, 2014, which are incorporated herein by reference.

BACKGROUND

Demand for narrowcast services continues to grow, especially demand related to high-speed data and video services provided over the Internet. In order to provide the increased capacity necessary for the increased demand for higher amounts of data and video services, outdated or aging networks may need to be upgraded.

SUMMARY

The following summary is for illustrative purposes only, and is not intended to limit or constrain the detailed description.

Many modern networks include both digital and analog elements. Some networks, such as hybrid fiber-coax (HFC) networks, may include an analog forward optical link. In some hybrid fiber-coax networks, the analog forward optical link may be a limiting factor in achieving advanced modulation profiles present in some cable modems. For example, some cable modems use the higher modulation orders supported in the Data over Cable Service Interface Specifications (DOCSIS) 3.1 standard to support higher capacity in the available hybrid fiber-coax network spectrum.

In the example of a cable network, combined CATV and subscriber data systems are often designed to comply with the DOCSIS group of standards promulgated by Cable Television Laboratories, Inc. A DOCSIS head end may include a cable modem termination system (CMTS) that sends and receives communications to individual subscribers. Under later versions of the DOCSIS standards, the CMTS functions may be divided between a modular CMTS (M-CMTS) core and one or more Edge Quadrature Amplitude Modulation (EQAM) devices. Because of the manner in which functions are divided between an M-CMTS core and EQAMs, the separation between these devices may be limited to several hundred feet.

By replacing the analog forward link with a digital forward link, a service provider may improve the link modulation error ratio (MER), which, when combined with advanced headend equipment, may enable a cable modem to support the high-order modulation profiles included in DOCSIS 3.1.

There are several ways a digital forward link may be implemented. One embodiment, referred to as remote physical layer (PHY), may include distributing physical layer components (e.g., downstream modulation components) of the access network equipment (e.g., the converged cable-access platform (CCAP)), into the hybrid fiber-coax network.

The summary here is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying drawings in which like numerals indicate similar elements.

FIGS. 3A-3B illustrate example networks according to various features described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Various features of methods and systems for using a digital forward link in a hybrid fiber-coax network will be described in greater detail below. But first an exemplary operating environment as shown in FIGS. 1 and 2 will be described.

Figure 1:
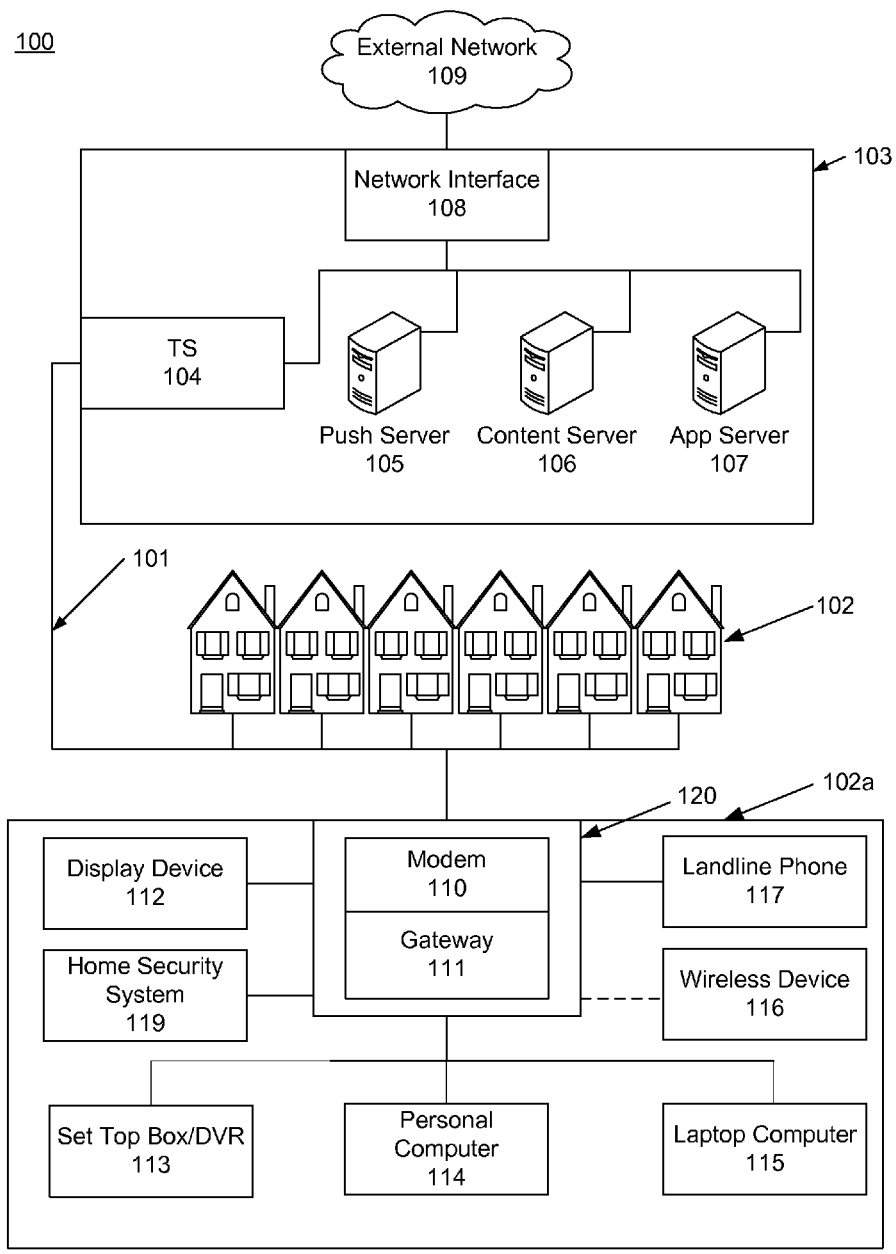
FIG. 1 illustrates an example communication network on which various features described herein may be implemented.
Figure 2:
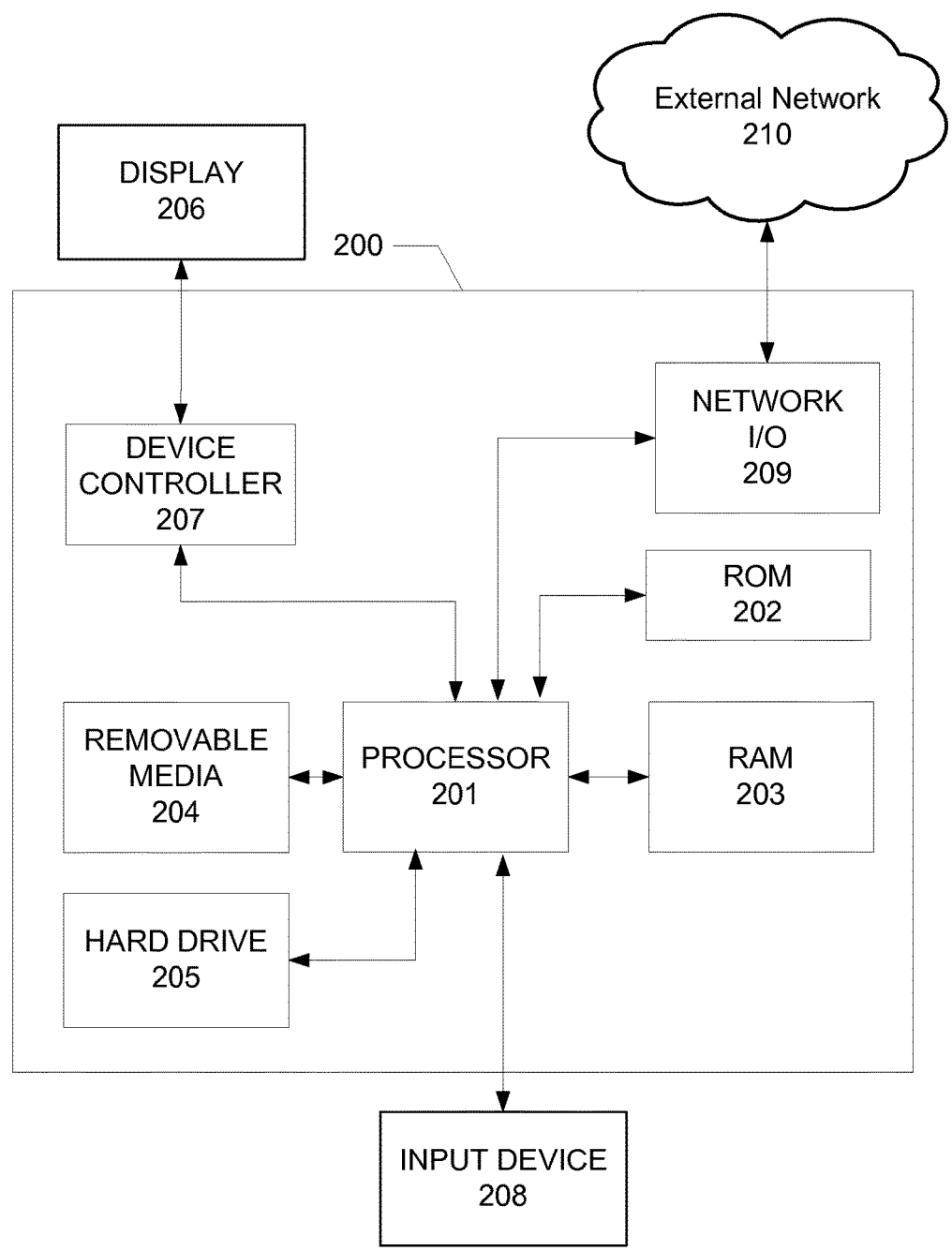
FIG. 2 illustrates an example computing device that may be used to implement any of the features described herein.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber-coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a headend or local office 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface, such as a termination system (TS) 104. More specifically, the interface 104 may be a cable modem termination system (CMTS), which may be one or more computing devices configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which may permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be one or more computing devices configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Still, another application server may be responsible for receiving and transmitting communications related to a security system in accordance with the present disclosure. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data, which may include security system access information, restrictions, and access logs as a result of performing steps described herein.

An example premises 102a, such as a home, may include an interface 120. The interface 120 may include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be one or more computing devices that communicate with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g., Voice over Internet Protocol—VoIP phones), home security system 119, and any other desired devices. Examples of the local network interfaces include Multimedia Over Coax Alliance (MoCA) interfaces, Ethernet interfaces, universal serial bus (USB) interfaces, wireless interfaces (e.g., Institute of Electrical and Electronics Engineers (IEEE) 802.11, IEEE 802.15), analog twisted pair interfaces, Bluetooth interfaces, and others.

Having described an example communication network shown in FIG. 1 in which various features described herein may be implemented, an example computing device as shown in FIG. 2 will be described.

FIG. 2 illustrates general hardware elements that may be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television or monitor, or an integrated display), and may include one or more output device controllers 207, such as a video processor. There may also be one or more user input devices 208, such as a remote control, keyboard, mouse, touch screen, microphone, camera for capturing images and/or video, and the like. One or more input devices 208 may be integrated within the computing device 200. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include security system application data 201a which may enable the device to perform the steps described herein.

The FIG. 2 example is a hardware configuration, although the illustrated components may be wholly or partially implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity may be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Having discussed an example network environment and computing device, discussion will now turn to additional details about distributing data over a network, such as network 101. Additional detail regarding potential configurations for the interface 104 and network of links 101 will be included below.

FIGS. 3A and 3B illustrate example networks that may include different methods of transmitting information over a network, as described further herein.

For example, a hybrid fiber-coax network may use a fiber transport between the headend and the coaxial cascade. A single fiber jacket may include multiple fibers. A fiber link may reduce the size of one or more coaxial cascades. Reducing the size of coaxial cascades may improve performance. One way to reduce the size of a coaxial cascade may be by using analog-modulated lasers and receivers, both upstream (from a node towards a headend) and downstream (from a headend towards a node).

The performance of an upstream link may be improved by replacing one or more analog modulators with one or more digital transports. Replacing analog modulators with digital transports may improve performance, and may allow for longer distances between the headend and the node. In some systems, different vendors may implement proprietary methods and technical capabilities to implement a digital transport. If a proprietary method is used to implement a digital transport, a system may only function if the same vendor's components are used for both the node and the headend. In other words, some components used for a node may be incompatible with some components used for a headend.

In past systems, the downstream link may have remained almost unchanged over time, with enhancements focused on improving distance and RF spectrum capacity. Performance of the downstream link may have had less of an effect on the network than the upstream link. But while the digital capacity of the upstream link may have been limited to a few megabits per second (e.g., well under a gigabit of digital capacity which may easily be digitized and carried with Ethernet optics), the downstream digital capacity necessary to transport the downstream spectrum may have been considerably higher (e.g., reaching and even exceeding 10 gigabits per second).

In some networks, upstream transmissions and downstream transmissions may be separated. For example, upstream transmission may occur on an upstream spectrum. Some networks may transmit upstream traffic starting from 5 MHz, and may include signals up to 54 MHz, 85 MHz, and 200 MHz. Downstream transmission may occur on a downstream spectrum. The downstream spectrum may begin starting at 54 MHz, and may include signals up to 1 GHz, 1.2 GHz, and beyond. In some networks, upstream and downstream signals may be combined over a range of spectrum (e.g., 5 MHz to 1 GHz).

Because of some of the above, some systems continue to use analog forward links. And, while headend equipment may launch signals with >47 dB MER performance, which may be sufficient to generate and transport a high number (e.g., 16,384) of quadrature amplitude modulation (QAM) signals, analog lasers may be limited in performance (e.g., to about 35-38 dB of MER performance), which may limit end-of-line performance (e.g., to barely enough for 2,048 QAM or 4,096 QAM in short cascades).

MER may indicate the quality of the signal for QAM modulation. For example, the MER may compare the ideal to the actual. Alternative or additional measures of signal quality may include digital SNR, RXMER, or TXMER.

As time has gone by, technology evolution and certain developments may now allow for implementing a digital forward link. For example, a QAM edge modulator may support any number of modulators (e.g., 1, 2, 3, 32, 64, or more).

One potential benefit of implementing a digital forward link (e.g., moving the QAM modulator from the headend to the node, eliminating the analog link between the headend and the node, and replacing the analog link with a digital link) may include improving the MER of the link between the headend and the node by 6 or 7 dB. In one embodiment, a 3 dB improvement in MER may translate to a 25% increase in throughput. Additionally, a signal that may be encoded at 10 bits per hertz (e.g., using an analog link) may be encoded at 14 bits per hertz (e.g., using a digital link).

In some embodiments, the local office 103 may be a CCAP device. A CCAP device may be similar to a converged edge services access router (CESAR), or a converged multiservice access platform (CMAP). A CCAP may be used by different service providers in different ways. For example, a CCAP may have more or fewer ports, which may be used for different headend or hub applications. A CCAP may implement video encryption internally, or video encryption may be implemented externally from the CCAP.

The CCAP may combine the functions of the video QAM modulator and DOCSIS into a single platform. The CCAP may be a computing device that may incorporate data transport (e.g., DOCSIS) and MPEG video functions. The CCAP may transmit video separately from data. The CCAP may be in communication with a network backbone and with a plurality of nodes in the domain of the CCAP. Each node may communicate with subscriber devices located in multiple subscriber premises within an sub-network served by the node. The CCAP may manage subscriber information, control Quality of Service (QoS) levels for the subscriber devices, forward data to subscriber devices via the nodes based on service flows, and receive data from subscriber devices via the nodes for forwarding across the network backbone. Nodes within a single CCAP domain may utilize different transport technologies and protocols. For example, one or more nodes may employ hybrid fiber coax (HFC) transport technologies and protocols, one or more additional nodes may employ passive optical network (PON) transport technologies and protocols, one or more nodes may employ wireless communication transport technologies and protocols, and one or more nodes may employ digital transport technologies and protocols.

Another development may be related to partial or complete migration to digital video (e.g., instead of analog video). With this technological evolution, it may be conceivable to remove the RF combiner network, and instead implement it digitally in the edge device, such as the CCAP.

In FIG. 3A, a network 300 may transmit information from a local office 301 (e.g., a CCAP device) to a node (e.g., node 302). The transmission of the information may include transmitting the information over a link 303 as an RF signal from local office 301 to a laser (e.g., laser 304). Laser 304 may modulate the information onto an analog modulated (AM) link 305 to the node 302. The node 302 may receive and demodulate the information. The node 302 may then transmit the information from the node 302 to network 306 (e.g., an HFC network). Network 306 may then transmit the information to premises 102.

In one embodiment, the performance of the AM link 305 may be limited (e.g., to less than 40 db SNR), which may limit end of line (EOL) performance (e.g., to approximately 35-36 dB SNR).

Additionally, AM link 305 may be industry proprietary, which may make installation and maintenance of components of AM link 305 expensive and difficult. Further, an industry-proprietary AM link 305 may be difficult to use in other network applications.

Future networks may wish to provide support for new network specifications (e.g., DOCSIS 3.1). In one embodiment, DOCSIS 3.1 may support up to 4K QAM. In another embodiment, DOCSIS 3.1 may support up to 16K QAM, which may be transported using higher SNR than may be available at EOL in the network 300 illustrated in FIG. 3A.

Additionally, as network 300 increases in size and segments, space and power limitations may met using denser headend (HE) equipment.

In FIG. 3B, network 310 may transmit information from a local office 311 (e.g., a CCAP device) to a node 312 over a digital link 315. In comparison to FIG. 3A, the network 310 illustrated in FIG. 3B replaces network 300's AM link 305 with digital link 315. Additionally, the RF modulation/demodulation components (e.g., laser 304 and accompanying demodulation components in node 302), which may be known as PHY, may be moved from headend equipment (e.g., local office 301) to node 302—as illustrated in local office 311 and node 312. Such a node may be referred to as Remote PHY (e.g., a network where the PHY is remote from the headend).

In one embodiment, in addition to replacing AM link 305 with digital link 315, network 310 may implement a protocol to communicate unmodulated data bits from the headend to the remote PHY in the node 312, and vice versa.

Additionally, network 310 may include a timing interface to communicate synchronization between the headend and the remote PHY in node 312.

Additionally, network 310 may include a configuration and management protocol and interface for the remote PHY from the headend device.

In some embodiments, digital link 315 may include an industry-standard link (e.g., Ethernet). An Ethernet link may enable a reduction in installation and maintenance cost. Further, Ethernet may be used in different network applications.

A digital link (e.g., digital link 315) may allow for denser headend equipment, which may reduce the space used for node segmentation. That is, as a network operator seeks to expand and upgrade a network, using a digital link (e.g., digital link 315) instead of AM link 305 may allow for a more economical method for expanding network capacity. Further, the network may use a single linecard for upstream and downstream (e.g., instead of separate linecards for upstream and downstream traffic). The single linecard might not include the PHY. Furthermore, the single linecard may include Ethernet connectors (e.g., instead of F connectors), which may result in improved density over RF (e.g., 8× better density). Additionally, denser headend equipment may offer significant space and power savings beyond RF CCAP.

Remote PHY may include further benefits. For example, performance may improve. A network operator may be able to transmit data via signals with a higher capacity per Hertz, and do so over a longer distance. A network implementing remote PHY may also experience improved reliability, as the network may include fewer components, and may use redundancy.

Additionally, a network integrating a digital forward link may allow for network integration of HFC with PON and P2P services. Such integration may prove beneficial, for example, for long hub or OTN-home distances.

Remote PHY may also result in operational simplifications and lower costs. For example, an Ethernet link may run more reliably than an analog-modulated link, and therefore may be more easily maintained. A network integrating a digital forward link may be implemented using a reduced number of OSP network components. Additionally, OSP maintenance needs may be lower. Power consumption may also be lower.

Figure 4:
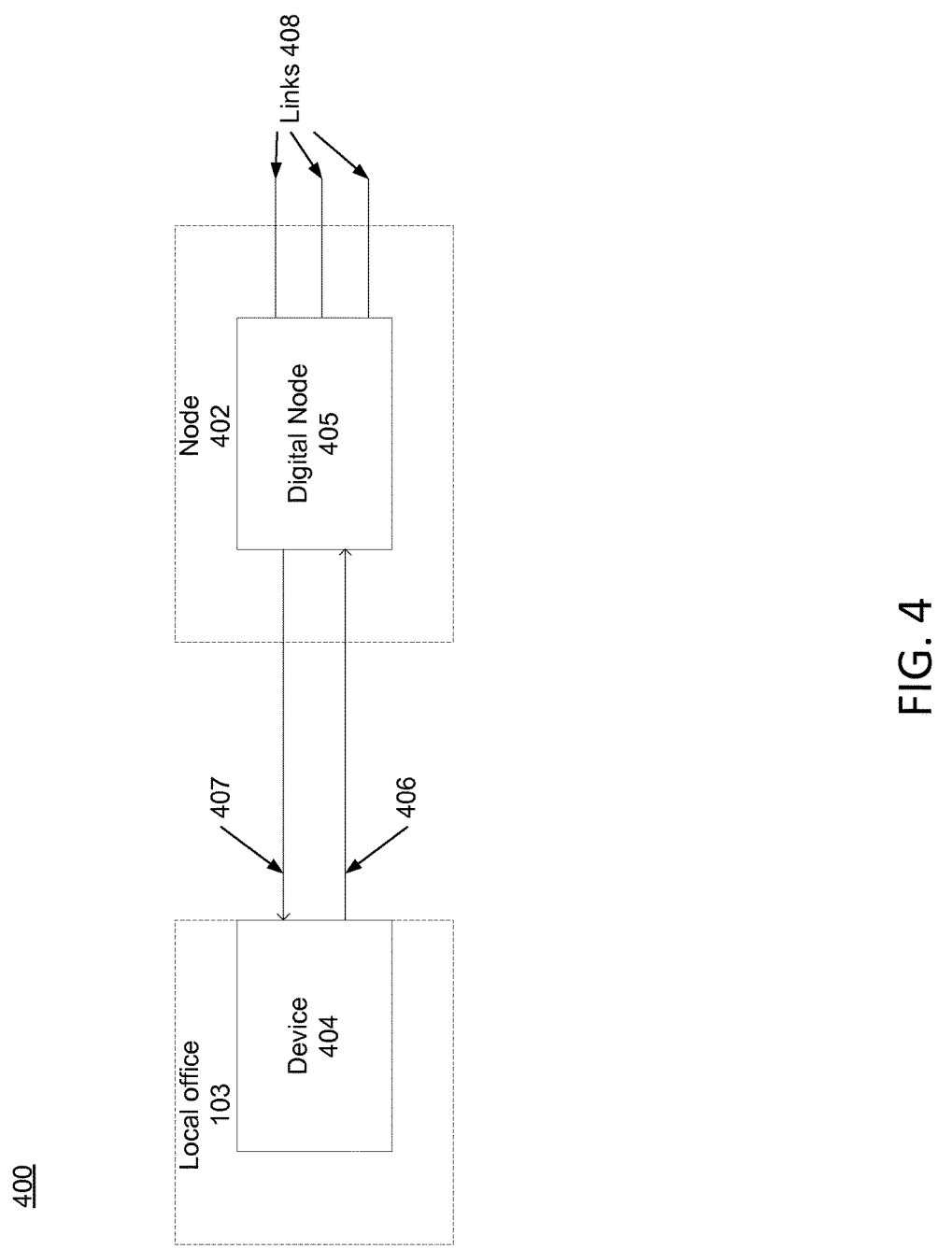
FIGS. 4-9 illustrate example implementations of different network according to various features described herein.

FIG. 4 depicts one illustrative embodiment of a high-level architecture for a network including a digital forward link. For example, network 400 may be one embodiment of a network similar to network 100. The illustrated portion of network 400 may include a more detailed illustration of components included in links 101.

Network 400 may extend the CCAP PHY into the HFC network by moving modulation and demodulation components to the node (e.g., node 402), but keeping MAC and higher layers in the CCAP. This may result in operational, performance, and cost improvements. The architecture of network 400 may extend existing MSA to the US, and modify timing and OSS.

Network 400 may include a headend device, such as device 404. In some embodiments, device 404 may be similar to interface 104. Device 404 may include a CCAP. In some embodiments, the CCAP may be a high-density edge QAM that includes QAM modulation for the entire spectrum.

Network 400 may include a node, such as node 402. Node 402 may include a digital node, such as digital node 405. Node 402 may include links 408 (e.g., analog transmission wires, coaxial cable, etc.) in communication with multiple premises, such as premises 102.

Network 400 may include one or more links between device 404 and node 402, such as links 406, 407. In some embodiments, some links may be used for downstream communication, and other links may be used for upstream communication. For example, link 406 may be used for downstream from device 404 to digital node 405, and link 407 may be used for upstream from digital node 405 to device 404. Links 406, 407 may be digital. For example, the links 406, 407 may be Ethernet links. The links 406, 407 may operate according to one or more defined protocols, for example IEEE 802. In some embodiments, links 406, 407 may include the same transmission capability (e.g., 1 Gigabit Ethernet), while in other embodiments links 406, 407 may include different transmission capability (e.g., link 407 is 10 Gigabit Ethernet, while link 406 is 1 Gigabit Ethernet).

Node 402 may, in some embodiments, include components that in some other networks may be implemented at an edge QAM or a CCAP that generates RF signals. Different components may be implemented at the local office 103 or node 402, depending on the embodiment.

Different potential embodiments with different configurations are described in greater detail in FIGS. 5-9. For example, links 406, 407 may be similar to links 509, 607, 708, 807, 908. Different types of data (e.g., raw bits, encoded bits, type of data bits, etc.) may be transmitted from the headend to the node in the embodiments depicted in FIGS. 5-9.

Figure 5:
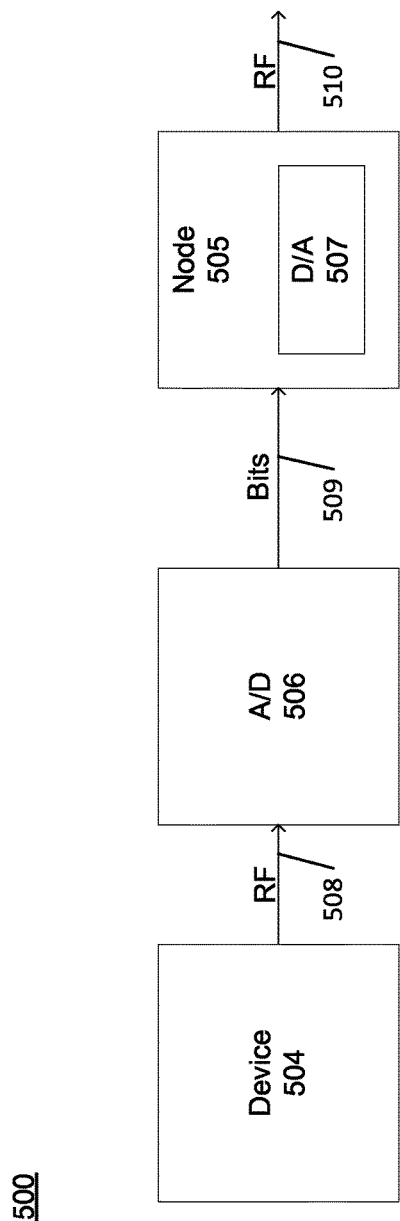

FIG. 5 includes a block diagram of one illustrative embodiment of a network 500. In network 500, device 504 (e.g., a headend device, a CCAP, etc.) may transmit an RF signal to an analog-to-digital converter 506 (e.g., over link 508). For example, device 504 may include a QAM, and the output of the QAM may be sent to the analog-to-digital converter 506.

Analog-to-digital converter 506 may receive the RF signal from device 504, convert the RF signal to a digital signal, and transmit the digitized RF signal (e.g., a digital bitstream) to node 505 (e.g., over link 509). For example, analog-to-digital converter 506 may sample the RF signal received from device 504, digitize the signal, and transmit the digitized signal to the node 505. In some embodiments, transmitting the digitized RF signal from the analog-to-digital converter 506 to node 505 may improve the signal-to-noise ratio across the link (e.g., link 509), which may improve performance of network 500.

Node 505 may include digital-to-analog conversion equipment (e.g., digital-to-analog converter 507), which node 505 may use to regenerate the RF output in the node. Node 505 may then transmit the regenerated RF signal to network 306 (e.g., over link 510), which may include transmitting the signal to premises 102.

In network 500, device 504 may be substantially similar to headend equipment (e.g., CCAP 301) in a network not implementing a digital forward link (e.g., network 300). An RF signal may be generated in device 504.

In network 500, the RF output from the headend may be digitized. The digitized signal may be transported digitally. The node 505 may regenerate the RF signal. Due to the double conversion—from RF to digital, then from digital to RF—there may be a loss of MER. A loss of MER may result in a smaller performance improvement in network 500 over a network not implementing a digital forward link (e.g., network 300) than other embodiments discussed herein.

In network 500, the system may maintain HFC transparency.

A network like network 500 may transmit data at a high bitrate over fiber. For example, the capacity to support multiple nodes might not fit into the available capacity of one 10 G fiber.

Furthermore, the rate that the signal is sampled at may be used to determine the resolution of a video contained in the signal. For example, to prepare to transmit a 1 GHz RF signal, Nyquist sampling may be used to sample slightly more than 2×. Thus, a 1 GHZ signal may be sampled at a data rate of approximately 2 Giga samples per second. The signal may be modulated at the rate of the actual launch frequency.

A node in network 500 may include less intelligence in the node than some other embodiments discussed herein.

In some embodiments, network 500 may include an additional conversion stage in the headend.

Network 500 may include an equivalent to a digital return.

Figure 6:
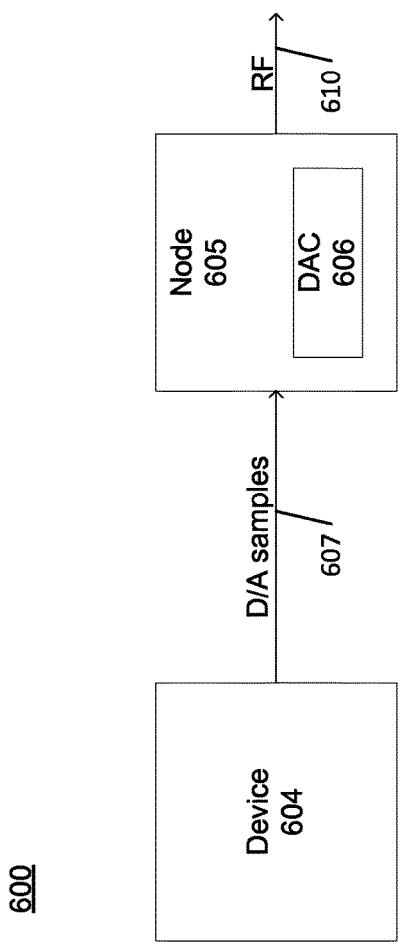

FIG. 6 includes a block diagram of one illustrative embodiment of a network 600. In network 600, digital-to-analog conversion may be implemented in node 605.

In network 600, digital-to-analog conversion may only take place at the node 605 (e.g., using digital-to-analog converter 606), and not at the headend (e.g., device 604). For example, the entire modulation process may take place in the node 605.

Content, such as data or video from a server (e.g., content server 106), may be transmitted (e.g., using link 607) in digital form from the local office 103 until reaching the node 605. For example, device 604 (e.g., a headend, a CCAP, a router, etc.) may transmit digital-to-analog samples (e.g., 12-bit D/A samples), to the node 605. The digital-to-analog samples may be transported digitally (e.g., over link 607).

At node 605, the content may be converted into analog form (e.g., using digital-to-analog converter (DAC) 606). The entire modulation may occur in the node. For example, in contrast to network 500—which may include a DAC at device 504, A/D 506, and another DAC (e.g., D/A 507) in node 505—network 600 may include a DAC (e.g., DAC 606) at node 605, and not include a DAC at device 604, or an analog-to-digital converter.

Node 605 may then forward the analog signal that includes the content to premises 102 via an analog transmission method. For example, an RF signal including the content may be forwarded using link 610, which may be an analog transmission segment (e.g., coaxial cable, a link similar to links 408, etc.). Link 610 may be connected to a service group (e.g., premises 102).

In network 600, the digital-to-analog conversion may be separated from the modulator. Further, the DAC may be separated from the rest of the PHY.

In network 600, less intelligence may be placed in node 605 than in some other networks implementing a digital forward link.

Network 600 may, in some embodiments, transmit data at a high bitrate over fiber. In some embodiments, one 10 G fiber connection might not have the capacity to transmit data to multiple nodes. In some embodiments, the amount of data that needs to be transported to node 605 (e.g., data to describe the QAM) may be very large. Thus, in some embodiments, one 10 G fiber connects device 604 to node 605.

Figure 7:
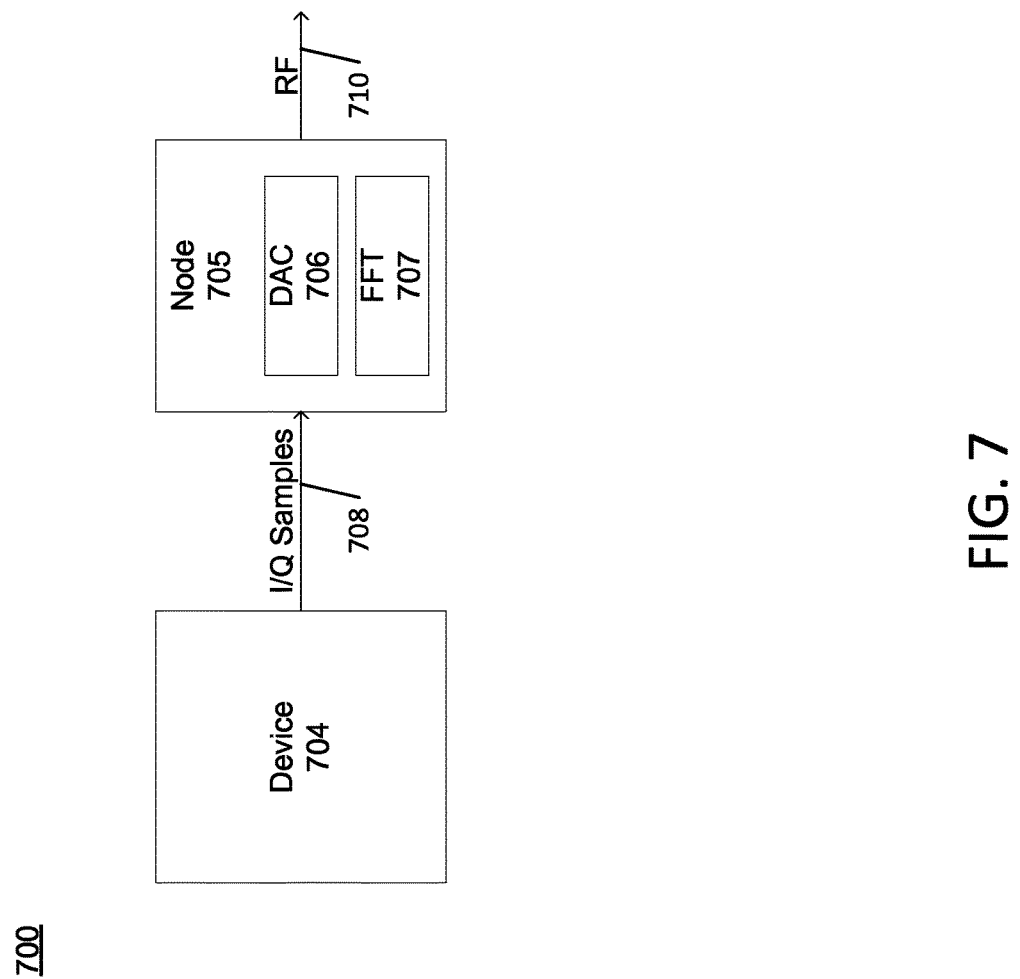

FIG. 7 includes a block diagram of one illustrative embodiment of a network 700. In network 700, part of the PHY (e.g., the lower PHY) may be implemented in node 705.

Network 700 may include device 704 (e.g., a headend, a CCAP, a router, etc.) and node 705. Device 704 may transmit I/Q samples to node 705 over link 708. For example, device 704 may transmit a QAM signal. For example, a 256-QAM signal may be visualized as including 256 dots (e.g., on an 8×8 grid). Link 708 may transmit the dot position of the QAM signal.

Thus, the amount of data sent may be significantly lower than in network 500 or network 600. For example, for a 12-bit signal, there may be a 12× reduction in the amount of data sent.

Furthermore, the rate that the signal is sampled at may be used to determine the resolution of a video contained in the signal. For example, in network 700, the signal may be modulated at the rate of the baseband frequency (e.g., not the actual launch frequency). For example, the baseband frequency may be 5 Mega sample per second.

In network 700, the PHY layer may be split into two components, including the upper PHY and lower PHY. The lower PHY may be implemented in node 705. The upper PHY may remain in device 704.

In network 700, more intelligence may be placed in node 705 than in some other networks implementing a digital forward link. For example, node 705 may include FFT 707. Additionally, node 705 may include DAC 706, which may be used to convert the I/Q samples from a digital encoding to an RF signal, which may be sent over link 710 to a service group (e.g., premises 102).

Network 700 may transmit data at a high bitrate over fiber. In some embodiments, network 700's bitrate over fiber might not be as high as some other networks that implement a digital forward link.

Network 700 may include an industry proprietary point-to-point link between a port on device 704 and node 705. The point-to-point link may transport the I and Q samples.

In some embodiments, network 700 may include one or more interfaces not previously defined in DOCSIS specifications (e.g., DOCSIS 3.0 or earlier). Implementing some embodiments may further include modifying the silicon used or planned to be used.

Figure 8:
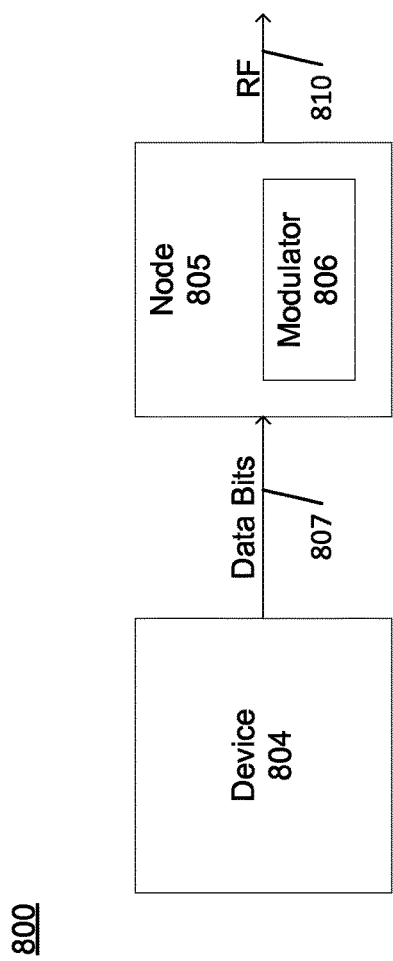

FIG. 8 includes a block diagram of one illustrative embodiment of a network 800. In network 800, the entire PHY may be implemented in node 805. Additionally, network 800 may include a packed-based link between the headend and the node.

Network 800 may transport less data than network 500, network 600, or network 700. Link 807, which may link device 804 (e.g., a headend, a CCAP, a router, etc.) and node 805, may transport data bits themselves, rather than, for example, transporting a representation of what the data bits are. This approach may be beneficial because link 807 may therefore transport at a lower data rate than in some alternatives, allowing network 800 to be implemented less expensively.

In network 800, more intelligence may be placed in node 805 than in some other networks implementing a digital forward link. For example, node 805 may include a modulator (e.g., some or all of the components of a QAM).

Network 800 may transmit data at a low bitrate over fiber. In some embodiments, one 10 G fiber link may include sufficient capacity to service multiple nodes (e.g., node 805).

Network 800 may be implemented, in some embodiments, using silicon devices already existing or planned to be added to a service provider network. Thus, implementing a network like network 800 may, in some embodiments, be implemented quickly and easily. Network 800 may thus allow reuse of network capacity.

Network 800 may enable a packet-based link between device 804 and node 805.

Network 800 may offer a better MER performance improvement over analog when compared to some other networks implementing a digital forward link.

Figure 9:
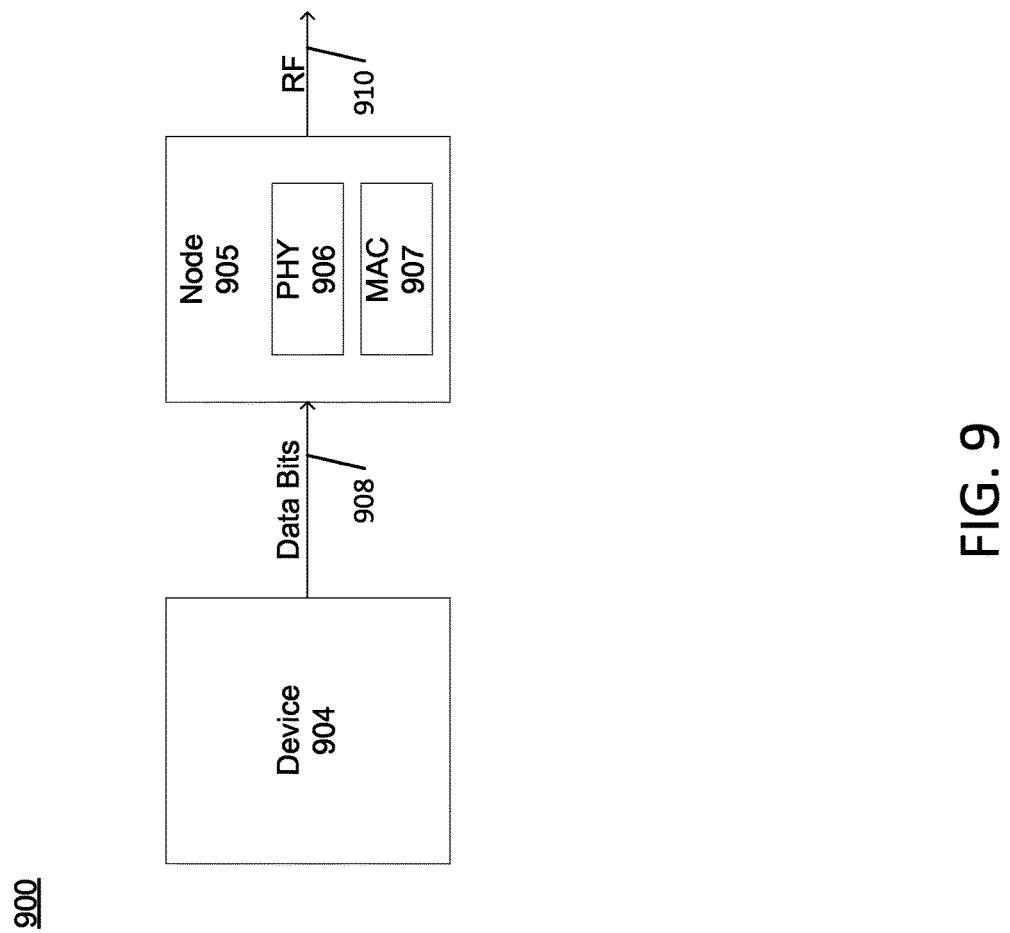

FIG. 9 includes a block diagram of one illustrative embodiment of a network 900. In network 900, the PHY 906 and the media access control (MAC) 907 may be implemented in node 905.

Network 900 may transport data bits over link 908 between device 904 and node 905, which may be similar to the process depicted in FIG. 8 of the transport of data bits between device 804 and node 805 over link 807.

Additionally, network 900 may include a packed-based link between the headend and the node.

Implementing the PHY 906 and the MAC 907 in node 905 may include implementing more intelligence in node 905 than some other networks implementing a digital forward link. For example, one or more functions that some networks may implement in the headend may in network 905 be implemented in node 905. Along with implementing the MAC in node 905, software may be implemented in node 905. Alternatively or additionally, a modulator may be implemented in node 905. Alternatively or additionally, a packet processor may be implemented in node 905.

An element of the network may generate the entire physical layer. In a network where the MAC is implemented in the headend (e.g., device 504, device 604, device 704, device 804), the MAC may be scaled to increase capacity as demands increase (e.g., increased transmission of unicast content, increased subscriber data demands), without having to upgrade the node. In network 900, where the MAC 907 is implemented in node 905, in order to increase capacity, the MAC 907 at each node 905 may be scaled.

In network 900, the data rate between device 904 (e.g., a headend, a CCAP, a router, etc.) and node 905 may be equivalent to the actual data transmitted. In some embodiments, the data rate may differ from the actual data transmitted as a result of adding ancillary network data.

Network 900 may transmit data at a low bitrate over fiber. In some embodiments, one 10 G fiber link may include sufficient capacity to service multiple nodes (e.g., node 905).

Network 900 may offer a better MER performance improvement over a network not implementing a digital forward link (e.g., network 300) than other networks implementing a digital forward link.

Figure 10:
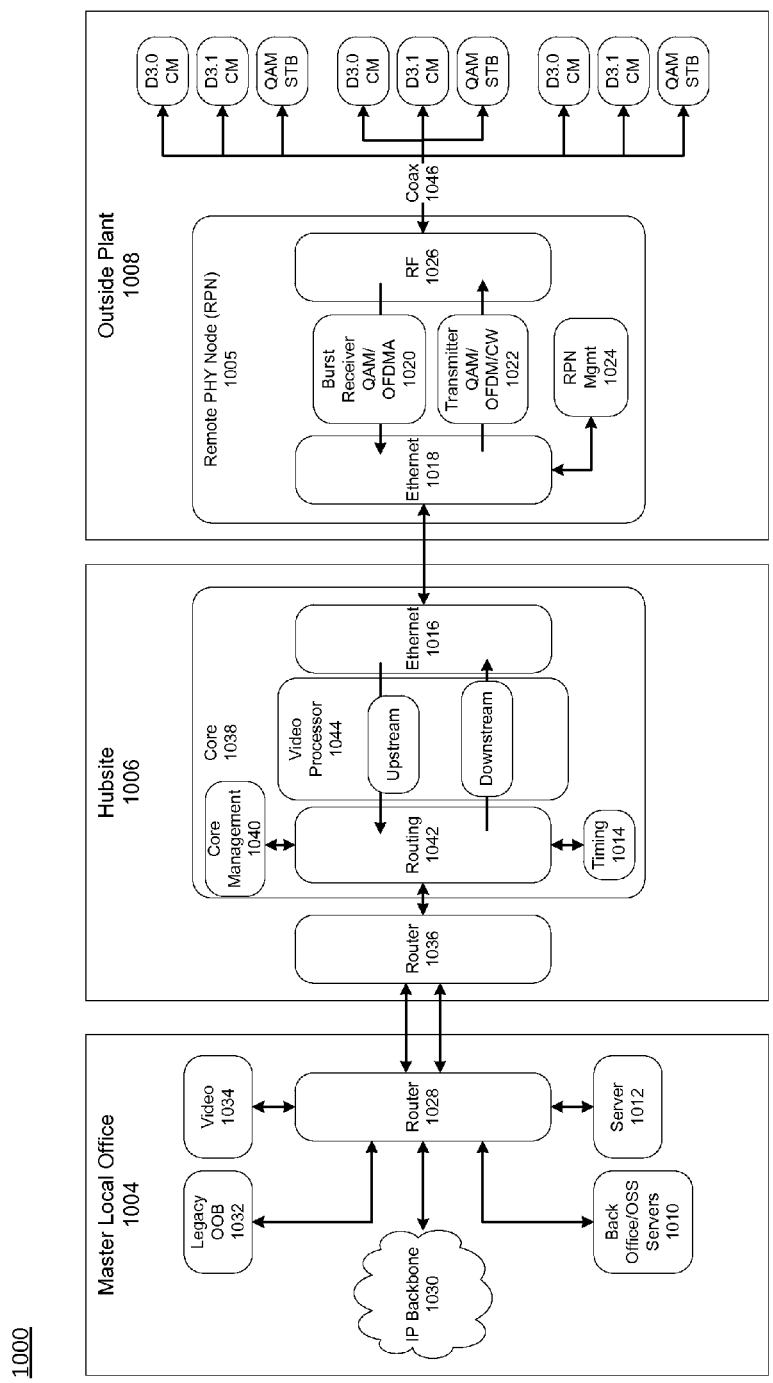
FIG. 10 illustrates an example block diagram of a system for implementing various features described herein.

FIG. 10 includes a block diagram of one illustrative embodiment of a network with a remote PHY architecture. A network 1000 may include various components, including master local office 1004 (e.g., a headend, a master headend, a building), hubsite 1006 (e.g., a building), and outside plant 1008 (e.g., an area of a physical network).

Implementing a digital forward link in a network with a remote PHY architecture may include adding various components to different parts of the network, including master local office 1004, hubsite 1006, and outside plant 1008.

For example, back office/OSS servers 1010 (e.g., provisioning and/or management servers) may communicate with router 1028 within master local office 1004. Server 1012 (e.g., a server may support the IEEE 1588 timing protocol) may communicate with router 1028 within master local office 1004. Back office/OSS servers 1010 and server 1012 may communicate with router 1028 within master local office 1004. Router 1028 may communicate with IP backbone 1030 (e.g., one or more connections to a converged regional area network (CRAN) and/or backbone routers), legacy out-of-band (OOB) 1032 (e.g., commanding control of legacy QAM set-top boxes), and video 1034 (e.g., QAM video sources for broadcast and/or narrowcast, video-on-demand).

In some embodiments, narrowcast signals may include anything other than broadcast. Alternatively or additionally, narrowcast signals may include multicast and unicast signals. In some embodiments, narrowcast signals may include one or more of video-on-demand, high-speed internet (HSI), network-based DVR service (nDVR), and switched digital video (SDV).

Router 1028 may communicate with Router 1036 in Hubsite 1006 (e.g., using Ethernet networks between Router 1028 and Router 1036). Router 1036 may communicate within Hubsite 1006 with Core 1038. Core 1038 may be a CCAP core. Core 1038 may include Core Management 1040, which may be in communication with routing 1042.

Routing 1042 may, in an implementation of a digital forward link, be in communication with timing component 1014. For example, timing component 1014 may be, a server or other computing device that implements a timing protocol, such as IEEE 1588. Timing component 1014 may generate a time quanta that may be used for aligning a MAC and PHY. For example, if a MAC and QAM modulator are separated (e.g., MAC being in Core 1038 and QAM being in Remote PHY Node 1005), a timing component (e.g., timing component 1014) may be used for coordinating timing synchronization between the MAC and QAM. For example, Transmitter QAM/OFDM/CW 1022 may use timing information provided by timing component 1014. Time synchronization may be used for downstream and/or upstream communications.

Routing 1042 may be in communication with video processor 1044 (e.g., a device that may perform DOCSIS and/or video processing). Video processor 1044 may receive and convert communications that are then passed on. For example, video processor 1044 may pass upstream communications from Ethernet 1016 to routing 1042, and may pass downstream communications from routing 1042 to Ethernet 1016.

Core 1038 may include QAM devices (not pictured). For example, in some networks, Core 1038 may provide service to one or more remote PHY nodes (e.g., Remote PHY Node 1005) and one or more non-remote PHY nodes (e.g., a node configured to receive RF from Core 1038). Thus, Core 1038 may include, for example, one or more components similar to Burst Receiver QAM/OFDMA 1020, Transmitter QAM/OFDM/CW 1022, RF 1026, and the like.

Remote PHY Node 1005 may communicate with Core 1038 over a digital link (e.g., an Ethernet link between Ethernet 1016 and Ethernet 1018). The digital link may be a digital, lossless Ethernet segment, which may span a great distance (e.g., 40 km or more). This digital link may be different than some networks, such as networks that include AM-modulated fiber between Core 1038 and a node (e.g., instead of a digital Ethernet link).

Remote PHY Node 1005 may include one or more modulators. For example, Remote PHY Node 1005 may include a QAM, an Orthogonal Frequency Division Multiplexing (OFDM) modulator, or like.

Remote PHY Node 1005 may include burst receiver QAM/OFDMA 1020. Placing a burst receiver in the node may improve PHY performance on the return path. For example, because the network may include shorter coax segments between a computing device (e.g., a cable modem) and a burst receiver, signals may be transmitted with one or more of higher modulation orders, higher transmits, higher throughput than in another network (e.g., a network where a burst receiver is located in the CCAP).

Ethernet 1018 may be in communication with transmitter QAM/OFDM/CW 1022, which may pass downstream communications from Ethernet 1018 to RF 1026. Ethernet 1018 may be in communication with Remote PHY Node (RPN) Management Module 1024.

RF 1026 may be in communication with a passive plant and/or an amplifier or a cascade of amplifiers. RF 1026 may communicate over coax 1046 with a number of different devices using any number of different protocols (e.g., D.30 CM, D3.1 CM, QAM STB). For example, coax 1046 may carry one or more of the following signals: DOCSIS 3.0 SC-QAM, DOCSIS 3.1 OFDM/OFDMA (including time signals for IEEE 1588 or SyncE), QAM Video (may include broadcast and/or video on demand), CW pilots for amps, and the like.

Ethernet 1016, 1018 between Core 1038 and Remote PHY Node 1005 may include one or more qualities. For example, Ethernet 1016, 1018 may run directly on dark single-mode fiber pair. Ethernet 1016, 1018 may run on a pair of CWDM wavelengths. Ethernet 1016, 1018 may run on a pair of DWDM wavelengths. Ethernet 1016, 1018 may use pluggable module for WDM MUX/DEMUX in the remote PHY node. Ethernet 1016, 1018 may run with daisy-chain connection between remote PHY nodes. Ethernet 1016, 1018 may dual-connect a given remote PHY node for redundant path.

Figure 11:
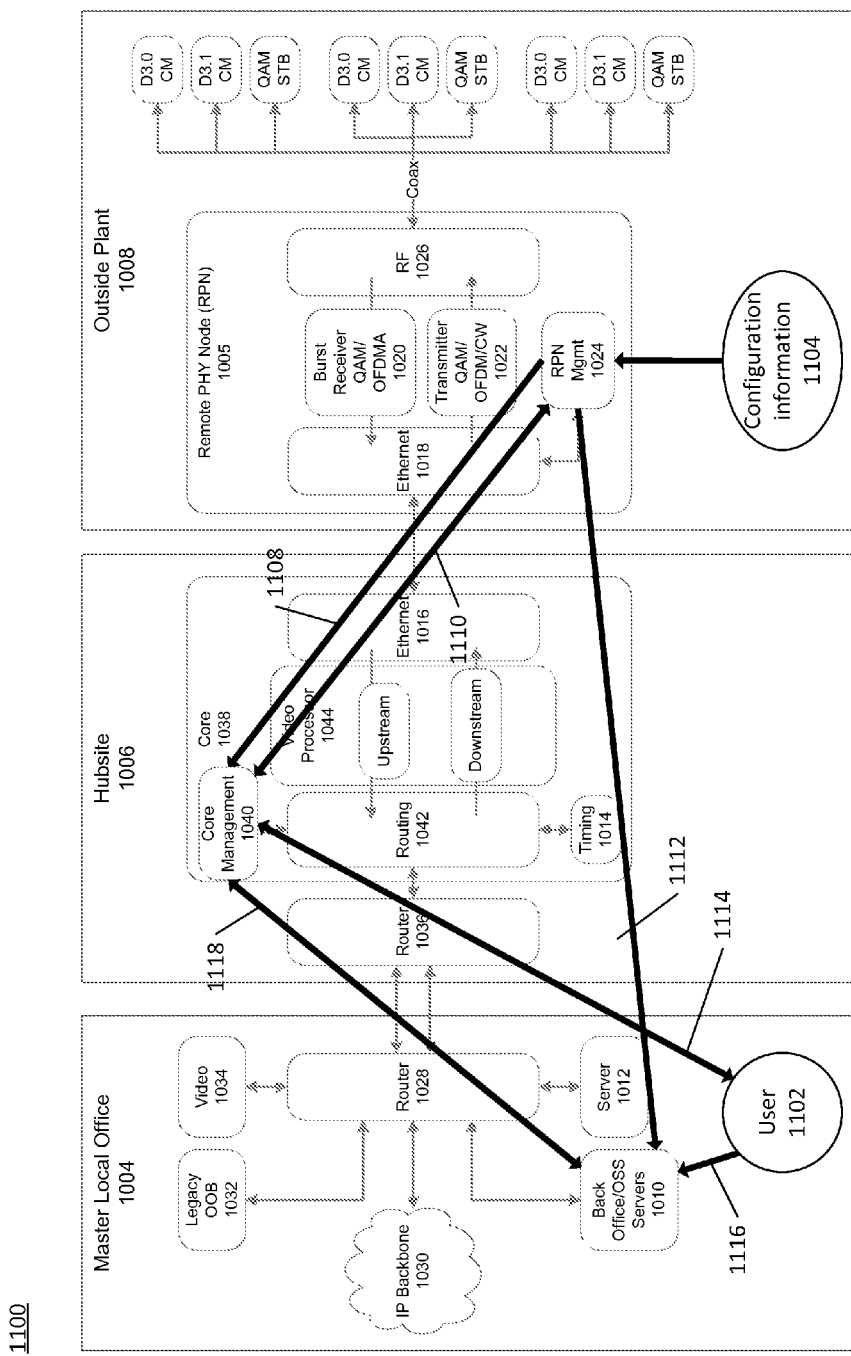
FIG. 11 illustrates a block diagram illustrating one method for configuring a network with a remote PHY architecture.

FIG. 11 includes a block diagram illustrating one method for configuring a network with a remote PHY architecture. FIG. 11 illustrates a network that may be similar to the network depicted in FIG. 10, with an overlay illustrating one process by which the network may be configured. While only one Remote PHY Node 1005 is depicted, a CCAP Core (e.g., Core 1038) may maintain a one-to-many relationship with a number of Remote PHY Nodes (e.g., Remote PHY Nodes 1005). For example, one CCAP Core may be responsible for managing or communicating with many Remote PHY Nodes.

Core 1038 may be configured before bringing a remote PHY node online. For example, the Core 1038 may be configured using a traditional manual process, which may include the use of scripts, proprietary CLI commands, and/or a standard CCAP OSSI schema-based XML configuration file. Core 1038 may implement standard login methods, routing protocols, and DHCP Relay Agent functions (e.g., for serving IP addresses to modems).

Core 1038 may implement standard CCAP SNMP MIBs, event messages, and IPDR service definitions.

Core 1038 may present itself to one or more service provider OSS tools as a single entity. Thus, rather than having to manage many remote PHY nodes (e.g., tens of thousands of Remote PHY Nodes 1005) at separate entities, a service provider may manage a number of CCAP Cores 1038 (e.g., several thousand CCAP cores) using a number of CMTSs (e.g., several thousand CMTSs). In order to present the Core 1038 as a single entity, the Core 1038 and each Remote PHY Node 1005 may work together, so that each Core 1038 may present itself as a virtual CCAP. Each Remote PHY Node 1005 may represent a linecard or some other kind of virtual hardware component within Core 1038. Thus, network operations and system administration may be simpler than if each Remote PHY Node 1005 were managed as a separate entity.

Core 1038 may be responsible for proxying one or more communications with Remote PHY Node 1005. For example, Core 1038 may share some boot time auto-configuration from a CCAP management block (e.g., Core Management 1040) with Remote PHY Node 1005. For example, Core 1038 may implement systems and protocols necessary for boot-time auto-configuration and ongoing run-time management of the Remote PHY Nodes 1005. For ongoing run-time management, there may be two-way communications between Core 1038 and Remote PHY Node 1005. Core 1038 may monitor the status of Remote PHY Node 1005. For example, Core 1038 may monitor the Remote PHY Node 1005 temperature, errors experienced, errors received, errors logged, and the like. Core 1038 may query Remote PHY Node 1005 for a status of the MER and the upstream from modems connected to the Remote PHY Node 1005. Core 1038 may proxy such communications from back-office OSS systems, management systems, and the like. Such communications may be communicated through Core 1038. Core 1038 may communicate with the set of sub-tended Remote PHY Nodes independently, and manage the set of Remote PHY Nodes. Thus, an upstream portion of the network to which Core 1038 is connected might not manage each remote PHY node independently, but instead may simply manage each CCAP core.

Each Remote PHY Node 1005 may be manually configured with a management IP address or may learn an IP address via DHCP. At power-on time, the Remote PHY Node 1005 may contact a pre-configured CCAP Core (e.g., Core 1038) for auto-configuration of one or more of runtime parameters for the Remote PHY Node 1005. For example, an MSO may configure a CCAP, and the CCAP may generate a configuration for one or more remote PHY nodes (e.g., using DHCP). If a Remote PHY Node 1005 cannot retrieve configuration parameters from Core 1038, Remote PHY Node 1005 may make use of parameters previously stored in NVRAM.

As illustrated in FIG. 11, configuration information 1104 may be provided (e.g., a field technician may enter, upload using a laptop with a serial cable, etc.) to Remote PHY Node 1005 (e.g., via RPN Management Module 1024). For example, the field technician may provide Remote PHY Node 1005 with bootstrap information, a static management IP configuration, a static IP address, parameters for communication between Remote PHY Node 1005 and Core 1038 (what CCAP core the node is assigned to, how to start the bootstrap process, etc.), and the like. The process for setting up an Remote PHY Node 1005 may be automated, manual, or a combination of automated and manual. For example, a protocol such as DHCP may be used to provide the remote PHY node with an IP address and/or other connectivity information. Alternatively or additionally, the remote PHY node may contact a preconfigured CCAP core to receive a product configuration, one or more runtime parameters, configuration parameters, and the like. In some embodiments, the remote PHY node may attempt to contact and receive configuration parameters from a primary CCAP (e.g., Core 1038), then contact a secondary or backup CCAP if the connection to the primary CCAP is unsuccessful. Alternatively or additionally, the remote PHY node may make use of previously-stored runtime parameters (e.g., stored in the RAM) if a connection to the CCAP is unsuccessful. Thus, the remote PHY node may have a level of fail tolerance. For example, if the remote PHY node experiences failure of one or more elements (e.g., a provisioning layer), the remote PHY node may use one or more previously-known good settings that may be used to operate the network.

Remote PHY Node 1005 may implement standard remote login methods (as well as serial console) for engineering debugging purposes. In some embodiments, Remote PHY Node 1005 may be assigned a management IP address, which may allow for remote access (e.g., a remote login) to Remote PHY Node 1005. For example, one may be able to login to Remote PHY Node 1005 remotely (e.g., using telnet) to perform debugging, troubleshooting, configuration, or the like.

RPN Management Module 1024 may provide 1108 remote PHY node run-time management information to Core Management 1040. RPN Management Module 1024 may exchange 1110 remote PHY node boot-time auto-configuration information with Core Management 1040. RPN Management Module 1024 may optionally provide 1112 remote PHY node boot-time DHCP configuration to Back Office/OSS Servers 1010.

Core Management 1040 may exchange 1114 CCAP Core CLI Manual Configuration with a user 1102 (e.g., an administrator, a CCAP engineer, etc.). User 1102 may provide 1116 additional configuration parameters to Back Office/OSS Servers 1010. Back Office/OSS Servers 1010 may optionally exchange 1118 CCAP Core XML Configuration information with Core Management 1040.

Remote PHY Node 1005 may act as a Layer-2 Bridge and might not implement an SNMP Agent, Network Event Messaging, or an IPDR Explorer. Some of these functions may be proxied by Core 1038 on behalf of the Remote PHY Node 1005. Core 1038 may include layer-3 routing functionality. Remote PHY Node 1005 may forward packets at a lower layer (e.g., a layer-2 bridge). Remote PHY Node 1005 may or may not make IP forwarding decisions. Remote PHY Node 1005 may or may not include an SNMP agent, which may allow for direct remote management. Remote PHY Node 1005 may or may not include capability for network event messaging (e.g., via syslog). Remote PHY Node 1005 may or may not include an IPDR exporter (e.g., allowing for usage records collection). One or more of the above-mentioned functions may be implemented in Core 1038 (e.g., proxied by Core 1038 on behalf of Remote PHY Node 1005).

Figure 12:
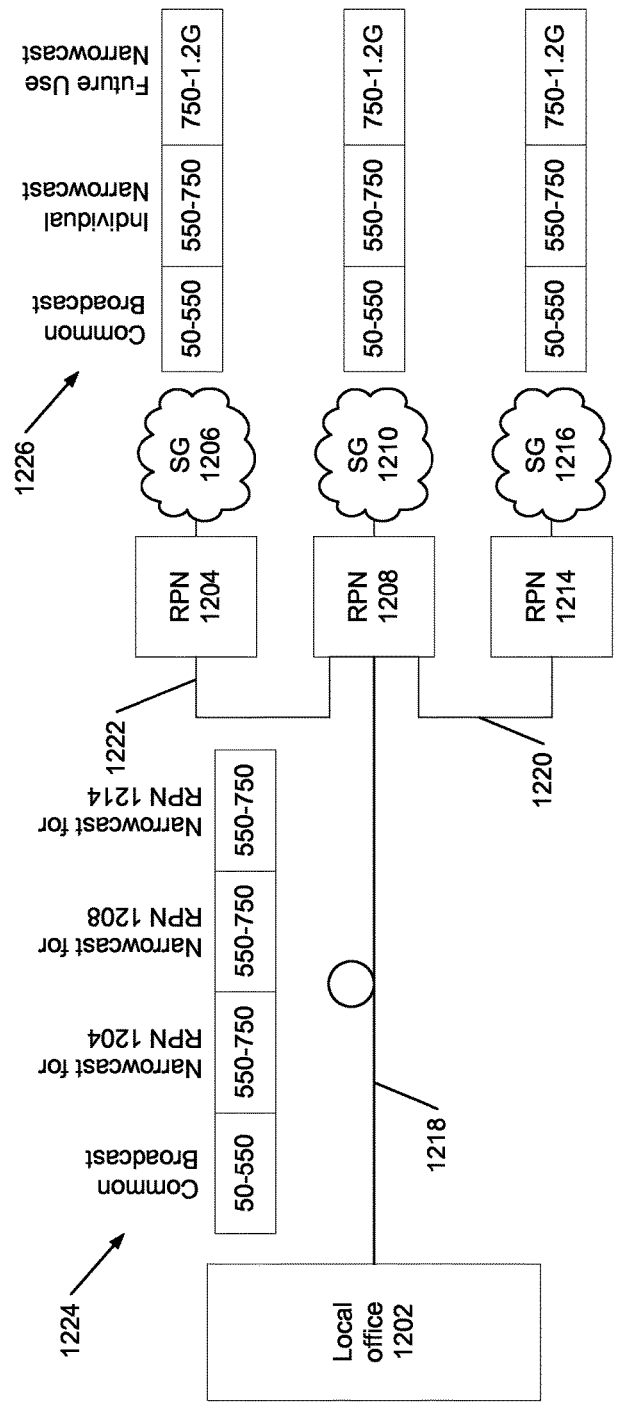
FIG. 12 illustrates one method by which Remote PHY may allow reuse of broadcast signals.

FIG. 12 includes one illustrative method by which Remote downstream PHY may allow reuse of broadcast signals.

Local office 1202 (e.g., a headend) may include an Ethernet interface, which may be connected via a digital link (e.g., link 1218) to one or more Remote PHY Nodes (e.g., Remote PHY Nodes 1204, 1208, 1214). Local office 1202 may include CCAP, UEQAM, etc.

Each Remote PHY Node may be connected to a service group (e.g., SGs 1206, 1210, 1216), which may include one or more homes, businesses, etc. For example, Remote PHY Node 1204 may be connected to SG 1206, Remote PHY Node 1208 may be connected to SG 1210, and Remote PHY Node 1214 may be connected to SG 1216.

As illustrated in FIG. 12, link 1218 may carry different types of signals at different frequencies, as illustrated in signal illustration 1224. For example, from 50-550 MHz, link 1218 may carry common broadcast signals. From 550-750 MHz, link 1218 may carry narrowcast signals for Remote PHY Node 1204, narrowcast signals for Remote PHY Node 1208, and narrowcast signals for Remote PHY Node 1214.

One or more of the Remote PHY Nodes may be connected to local office 1202. In some embodiments, local office 1202 may be connected to a subset of the nodes (e.g., Remote PHY Node 1208) over a link (e.g., link 1218), and the node may in turn be connected to other nodes. For example, in FIG. 12, local office 1202 may be connected to Remote PHY Node 1208. Remote PHY Node 1208 is connected to Remote PHY Node 1204 via link 1222. Remote PHY Node 1214 may be connected to Remote PHY Node 1214 via link 1220. Thus, rather than a connection directly from local office 1202 to each Remote PHY Node 1204, 1208, 1214, in FIG. 12, the headend device is only connected to Remote PHY Node 1208, which may use less fiber than what may be used if there were a direct connection between local office 1202 and each Remote PHY Node 1204, 1208, 1214. If link 1218 covers a large distance (e.g., 50 km), the fiber savings may be substantial.

Each Remote PHY Node may receive signals from local office 1202 (e.g., directly such as over link 1218, or indirectly such as through links 1220, 1222 to other nodes). For example, link 1218 may transport once the broadcast content that may be delivered to each Remote PHY Node 1204, 1208, 1214 (e.g., common broadcast 50-550). Narrowcast content may then be sent individually for each one of the nodes. Each one of the nodes may then implement logic to combine the broadcast content with the respective narrowcast content for the node. Thus, by only transporting broadcast content once across link 1218, the total amount of data transmitted in the long haul may be reduced.

Each Remote PHY Node 1204, 1208, 1214 may transmit received signals to respective service groups (e.g., SGs 1206, 1210, 1216). The transmission of signals from the node to the service group may be over an analog link (e.g., RF signals). The link between each node and a respective service group may carry different types of signals at different frequencies, as illustrated in signal illustration 1226. For example, from 505-550 MHz, a link between Remote PHY Node 1204 and SG 1206 may carry common broadcast signals. From 550-750 MHz, the link between Remote PHY Node 1204 and SG 1206 may carry individual narrowcast signals. The portion of the signal from 750 MHz-1.2 GHz may be reserved for future narrowcast use.

As FIG. 12 illustrates, remote PHY node service groups may be split as the amount for narrowcast increases. Additionally, multiple remote PHY nodes may use the same fiber initially (e.g., during initial deployment of Remote PHY nodes) when most spectrum is used for broadcast.

In considering various approaches for implementing a digital forward link, some basic, underlying tenets may be considered. In some embodiments, it may be desirable for the headend and node devices to be interoperable. It may also be desirable to limit specifications to areas necessary for interoperability.

Figure 13:
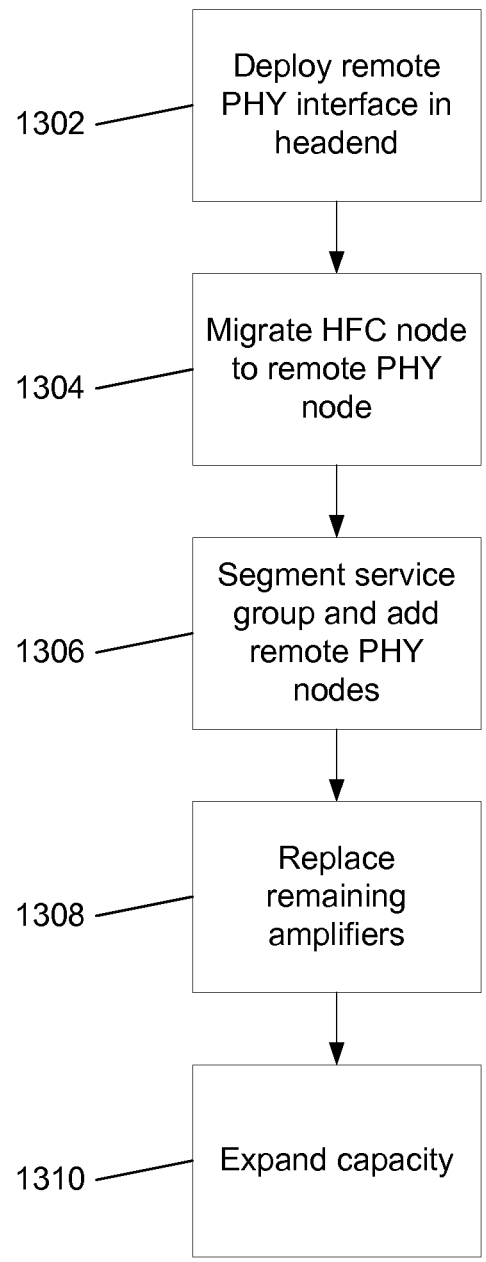
FIG. 13 illustrates one method that may be used for deploying a Remote PHY network.

FIG. 13 is a flowchart of one illustrative method that may be used for deploying Remote PHY. Remote downstream PHY may allow for a scalable deployment evolution. For example, a network operator may gradually implement digital links between the headend and the nodes, and need not upgrade the entire network at once. This graduated rollout may result in lower overall deployment costs, or avoidance of increased deployment costs over maintenance costs of a traditional HFC network.

In step 1302, a network operator may deploy a remote PHY interface (e.g., a remote PHY linecard) in a headend. For example, a remote PHY linecard may be installed in a headend (e.g., a CCAP). The remote PHY linecard may include a single linecard for upstream and downstream transmissions to and from the nodes. The remote PHY linecard may include one or more Ethernet connectors. Once a remote PHY linecard is installed at the headend, one or more of the nodes connected to the headend may be migrated from HFC nodes to remote PHY nodes. Alternatively or additionally, one or more new remote PHY nodes may be added to the downstream plant connected to the headend.

In step 1304, a network operator may migrate one or more HFC nodes to remote PHY nodes (e.g., during a CM window). For example, a network operator may convert or replace one or more HFC nodes. For example, a subset or all of the electronics or components of an HFC node may be removed or replaced with some or all of the components of a remote PHY node. For example, a QAM may be added to the node. Existing SM fiber (e.g., between headend and existing HFC node) may be used to carry signals between the headend and new remote PHY node.

In step 1306, a service group served by a node may be segmented, and one or more new nodes may be deployed. For example, a service group served by an HFC node may be segmented into 13 service groups, which may be smaller than the original service group. As remote PHY nodes are implemented, service groups connected to those nodes may change in size (e.g., become smaller), as each Remote PHY node may service a smaller service group than a non-Remote-PHY node (e.g., a node connected to the headend using an analog-modulated link). In some embodiments, one of the new service groups may be served by the original HFC node, which may be upgraded to a remote PHY node. The other twelve service groups may be serviced by twelve new remote PHY nodes, which may be added to the network. Each remote PHY node may be connected to one or more other nodes and/or to the CCAP. In another embodiment, an HFC node may be replaced by a number of new remote PHY nodes (e.g., ten nodes, twelve nodes, and the like), and the HFC node may be taken out of service. In another embodiment, the HFC node may continue to operate as an HFC node.

As network demands increase, a network operator may expand deployment of Remote PHY nodes as needed. For example, a network operator may split individual remote PHY node service groups as their demands become too great to be met by a single node. Then, the newly-deployed node may include Remote PHY technology. As needed, additional headend capacity may be added as well.

In step 1308, remaining amplifiers may be replaced. For example, some service groups or lines may include amplifiers that amplify signals being carried over fiber or other links between nodes and/or the headend. Gradually, as more remote PHY nodes are added to the network, the remote PHY nodes may be connected by shorter lengths of fiber (e.g., 1 km instead of 50 km), which may therefore use fewer or no amplifiers. Gradually, over time, as the number of remote PHY nodes increases, and service group size decreases, the number of amplifiers may be decreased. Furthermore, the network may be further segmented, which may increase narrowcast capacity.

In step 1310, the capacity of the headend may be expanded. For example, additional linecards may be added, additional ports, new linecards with increased capacity, or the like. Adding headend ports may allow for service groups to be split. Adding headend ports may allow for fewer remote PHY nodes to be connected to each headend port, which may allow each remote PHY node to receive increased capacity (e.g., increased data, throughput, etc.). Additional fiber may be added between the headend and one or more nodes. Alternatively, the existing fiber between the headend and the one or more nodes may be utilized to communicate with more nodes. For example, existing fiber may include multiple strands within one fiber jacket. During an initial deployment (e.g., step 1302), the headend may not have sufficient capacity to support outputting data to be transported across each fiber within the one fiber jacket. In step 1310, as additional capacity is added to the headend, the additional (e.g., unused) strands within the one fiber jacket may be used to connect the headend to one or more nodes.

Ultimately, a network may reach N+0 deployment. In other words, Remote PHY may be fully implemented over time, without major deployment costs, loss of service, or other difficulties that are common with the deployment of network infrastructure upgrades. Furthermore, even if the network were using traditional HFC, as network demands increase, the network capacity may also be increased. Thus, a migration to Remote PHY might not represent a significant cost increase over the demands that may accompany a traditional HFC network.

Figure 14:
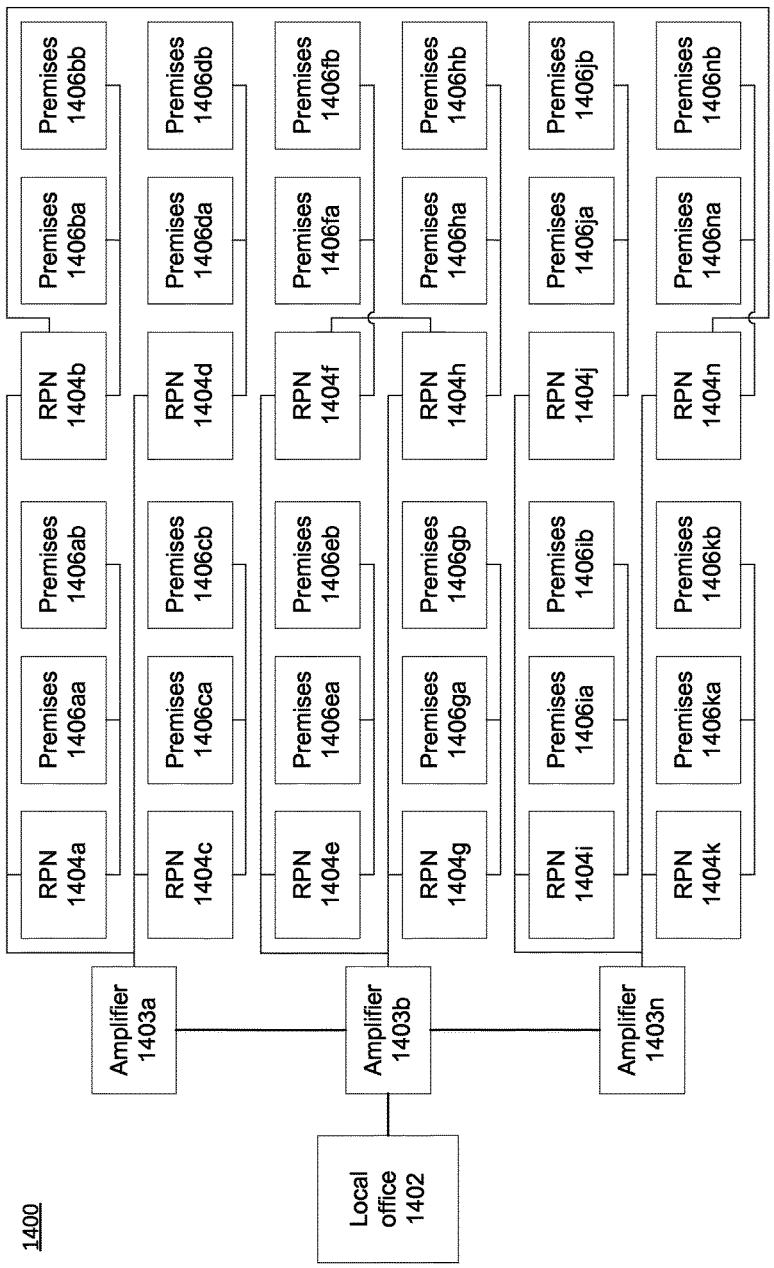
FIG. 14 is a block diagram of one embodiment of a network 1400 with redundant fiber connections between different nodes.

FIG. 14 is a block diagram of one embodiment of a network 1400 with redundant fiber connections between different nodes. Network 1400 may include one or more local offices 1402 (e.g., a headend), which may include one or more CCAP cores. Local office 1402 may be connected to one or more remote PHY nodes (e.g., Remote PHY Node 1404*a*, 1404*b*, . . . 1404*n*). Each remote PHY node may be connected to a service group. Each service group may include one or more premises (e.g., similar to premises 102). For example, Remote PHY Node 1404*a* may be connected to premises 1406*aa*, 1406*ab*, and/or additional premises (not pictured). Some nodes may be connected to different numbers of premises.

The connection between the headend and the remote PHY nodes may include one or more amplifiers (e.g., amplifier 1403*a*, 1403*b*, 1403*n*). The connection between the headend and each node may be a digital link (e.g., fiber, Ethernet, or the like). There may be one or more connections between the respective nodes. One or more connections may be redundant. For example, Remote PHY Node 1404*a* may be connected to Remote PHY Node 1404*b* and Remote PHY Node 1404*c*, Remote PHY Node 1404*b* may also be connected to Remote PHY Node 1404*n*, and so on. Some connections may be long (e.g., 50 km), while other connections may be short (e.g., 1 or 2 km). Thus, some or all of the nodes in the network 1400 may form a closed-loop, which may improve network performance. Network 1400 may be a digital network, and therefore may implement Ethernet switching.

If some segment of network 1400 fails (e.g., a connection between one of the nodes and another portion of the network), a node connected to the failed segment may still be connected to the network via one or more redundant connections (e.g., through a different node). For example, if the link between amplifier 1403*a* and Remote PHY Node 1404*a* is cut or otherwise fails, Remote PHY Node 1404*a* may still communicate with local office 1402 via the connection between Remote PHY Node 1404*a* and Remote PHY Node 1404*b*, which in turn connects to amplifier 1403*n* via Remote PHY Node 1404*n*.

Some additional features or aspects that may be implemented in one or more different embodiments are described below.

In some embodiments, it may be desirable to minimize the electronics housed in the node, and to minimize the software placed to run in the node. In some embodiments, it may be desirable to minimize the amount of capacity needed in the optical link.

In some embodiments, it may be desirable to keep higher layers in the headend.

In some embodiments, it may be desirable to maintain independence between the downstream and upstream. For example, it might not be necessary that the upstream and the downstream be on the same version of DOCSIS. For example, a newer version of DOCSIS may be used for the downstream while using an old version of DOCSIS for the upstream. In another example, a newer version of DOCSIS may be used for the upstream while an older version of DOCSIS may be used for the downstream.

In some embodiments, it may be desirable to maintain the digital forward link independent from the DOCSIS version. For example, the digital forward link may be compatible with more than one DOCSIS version, and thus may be used with multiple different nodes, even if hardware downstream of those nodes includes legacy or differently-versioned hardware.

In some embodiments, a remote PHY node may enable the use of switching from headend to node. In some embodiments, headend equipment may be virtualized.

In some embodiments, headend equipment may be pulled back from hub/OTN, which may make the hub a cross-connect location, and may centralize operation.

In some embodiments, a remote PHY node may enable link load sharing. Thus, multicast and broadcast to the node may be performed with a reduced total amount of data transported (e.g., avoiding replicating every bit on every link).

In some embodiments, the remote PHY node may be configured by CCAP (e.g., instead of by MSO). For example, MSO may configure CCAP, and CCAP may generate configuration for remote PHY node. In some embodiments, the remote PHY node may be configured using a DHCP and/or TFTP approach. In some embodiments, the remote PHY node may be served by CCAP. In some embodiments, CCAP may differentiate requests from remote PHY nodes and cable modems.

In some embodiments, the remote PHY node may include an IP stack. In some embodiments, the remote PHY node may include a built-in processor.

In some embodiments, the remote PHY node may support SNMP for monitoring. The remote PHY node may include traps for alarms. The remote PHY node may include support for external and/or centralized NMS. The remote PHY node may include configurable trap control to minimize unwanted or unnecessary traffic.

In some embodiments, remote PHY specifications may include one or more of the following: DEPI (e.g., update to support DOCSIS 3.1 and video); UEPI (e.g., update to support DOCSIS 3.1 and make public); timing (e.g., IEEE-1588v2); configuration (e.g., CCAP to auto-configure remote PHY, I-CCAP, MSO configures a CCAP but not a remote PHY node, interoperability between a remote PHY node and a CCAP from different vendors); management (e.g., support direct management of a remote PHY node via SNMP, a remote PHY node has IP stack and supports traps/alarms).

Additional objectives that may be considered when selecting a digital forward link implementation option may include developing an architecture that enables scalability as capacity is needed over time, minimizing the need for replacing the node components as additional capacity is needed, leaving system components that scale with capacity in the headend, using technologies used in other communications protocols when possible, minimizing space and power usage in the headend, minimizing power usage in the node, targeting the power consumption of a line extender as the maximum power usage, and enabling the use of the digital forward link for other networking functions.

In some embodiments, a standardized interface may be used between a remote PHY node and a CCAP core so that a remote PHY node from any vendor may be used with a CCAP core from a different vendor. For example, the standardized interface may describe how to configure a particular remote PHY node, which may allow any CCAP core to configure that particular remote PHY node. Such communications (e.g., standardized messaging) may be performed using any protocol. For example, remote PHY node from a first vendor may communicate with a CCAP core using a first protocol. A remote PHY node from a second vendor may communicate with the CCAP core using the first protocol.

In some embodiments, one or more remote PHY nodes in the network may be presented to a back office as one system, which may allow for interoperability of different nodes and CCAP cores from different vendors. Thus, the standardized interface may allow a CCAP core to program a remote PHY node. Also, the standardized interface may allow the CCAP core to maintain a remote PHY node.

The above listed tenets, considerations, and objectives might not be exhaustive. Other considerations specific to a particular vendor, service provider, geographic location, customer, or the like may offer further considerations for determining how to implement a digital forward link.

Considering the above-listed tenets and objectives as a whole, an embodiment where the entire PHY is moved to the node may, in some cases, provide a favorable balance of some or all the above-listed tenets and objectives.

A remote PHY approach may be applicable to different industries or solutions. For example, a cable company may use a Remote PHY approach for distributing video or data (e.g., Internet) services. In another example, a telephone company, which may provide data services (e.g., Internet) using DSL, may increase capacity at a lower cost by centralizing the MAC and distributing the PHY to one or more digital subscriber line integrated multiplexers (DSLIM). Thus, expanding the number of DSLIMs may be more economical, which may allow the telephone company to increase DSL service speed by installing more DSLIMs. In another example, a cellular network provider may increase capacity by centralizing the MAC and distributing the PHY at each tower for each service area. Thus, by distributing the PHY, the cellular network provider may increase capacity by using a lower cost implementation.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

We claim:
1. A system comprising:
a computing device comprising:
  a linecard configured for upstream data and downstream digital data, the linecard comprising:
    a first ethernet port for downstream distribution of the downstream digital data, the first ethernet port configured to perform the downstream distribution of the downstream digital data via a signal in a downstream spectrum; and
    a second ethernet port for reception of the upstream data, the second ethernet port configured to receive upstream transmission of the upstream data via a signal in an upstream spectrum; and
a node downstream of the computing device,
  wherein the first ethernet port and the second ethernet port are configured to together communicate with the node downstream of the computing device.

2. The system of claim 1, wherein the first ethernet port is configured to output the downstream digital data for the node downstream of the computing device, and wherein the second ethernet port is configured to receive the upstream data from the node downstream of the computing device.

3. The system of claim 1, wherein the upstream spectrum comprises a range from 5 MHz to 200 MHz, and wherein the downstream spectrum comprises a range from 54 MHz to 1.2 GHz.

4. The system of claim 1, comprising:
a hubsite comprising the computing device; and
an outside plant comprising the node downstream of the computing device,
  wherein the first ethernet port and the second ethernet port comprise an interface between the hubsite and the outside plant.

5. The system of claim 4, wherein the outside plant comprises a plurality of remote physical layer (remote-PHY) nodes, wherein each of the plurality of remote-PHY nodes comprises:
a processor;
an ethernet input;
a burst receiver; and
a modulator.

6. The system of claim 5, wherein the computing device is connected via one fiber to at least two of the plurality of remote-PHY nodes.

7. The system of claim 1, wherein the node downstream of the computing device is connected to a service group via a coaxial link, and wherein the node comprises:

an ethernet input;
a modulator; and
a burst receiver.

8. The system of claim 7, wherein the computing device performs one or more management functions of the node, wherein the computing device uses layer-three information and the node uses layer-two information.

9. The system of claim 1, wherein the computing device is configured to communicate with the node downstream of the computing device using the first ethernet port and the second ethernet port together by:
receiving, from the node downstream of the computing device, through the second ethernet port, a request for information, and
in response to the request for information, transmitting, to the node downstream of the computing device and through the first ethernet port, the information.

10. The system of claim 1, wherein the computing device comprises:
at least one processor; and
non-transitory memory storing computer-readable instructions that, when executed by the at least one processor, cause the computing device to:
receive a data packet from a server;
transmit the data packet to the node downstream of the computing device via the first ethernet port; and
receive a transmission from the node downstream of the computing device via the second ethernet port.

11. The system of claim 1, wherein the computing device is geographically remote from a modulator that is downstream of the computing device.

12. A method comprising:
transmitting, by a computing device, configuration information to a remote physical layer (remote-PHY) node over an ethernet link between the computing device and the remote-PHY node, the configuration information formatted according to a standardized interface, the configuration information using dynamic host configuration protocol;
transmitting, from the computing device and to the remote-PHY node, maintenance information formatted according to the standardized interface, and the maintenance information comprising remote-PHY node maintenance instructions; and
transmitting second configuration information from the computing device to a different remote-PHY node, the second configuration information formatted according to the standardized interface.

13. The method of claim 12, wherein the remote-PHY node is manufactured by a first vendor, and
wherein the different remote-PHY node is manufactured by a second vendor.

14. The method of claim 12, wherein the transmitting, by the computing device, the configuration information, comprises transmitting the configuration information via a linecard used for upstream data and downstream data, the linecard comprising a first ethernet port for downstream distribution of the downstream data and a second ethernet port for reception of the upstream data.

15. The method of claim 14, wherein the first ethernet port is configured to perform the downstream distribution of the downstream data via a signal in a downstream spectrum, and wherein the second ethernet port is configured to receive upstream transmission of the upstream data via a signal in an upstream spectrum.

16. The method of claim 15, wherein the upstream spectrum comprises a range from 5 MHz to 200 MHz, and the downstream spectrum comprises a range from 54 MHz to 1.2 GHz.

17. A data network, comprising:
a remote physical layer (remote-PHY) node comprising a modulator;
a computing device comprising:
a media access control (MAC) component, and
a timing component configured to generate timing information for synchronizing the MAC component and the modulator; and
an ethernet link between the computing device and the remote-PHY node, wherein the remote-PHY node is configured to:
receive downstream data over the ethernet link;
modulate and transmit the downstream data via a downstream coaxial link;
receive upstream data via the downstream coaxial link; and
transmit the upstream data over the ethernet link.

18. The data network of claim 17, wherein the ethernet link comprises an upstream portion and a downstream portion, and wherein the computing device comprises:
a bidirectional ethernet port that supports both upstream transmission and downstream transmission, wherein the bidirectional ethernet port is configured to:
transmit the downstream data to the remote-PHY node over the downstream portion of the ethernet link; and
receive the upstream data from the remote-PHY node over the upstream portion of the ethernet link.

19. The data network of claim 17, wherein the computing device comprises a linecard configured for the upstream data and the downstream data, the linecard comprising:
a first ethernet port for downstream distribution of the downstream data; and
a second ethernet port for reception of the upstream data, wherein the first ethernet port and the second ethernet port together communicate with the remote-PHY node via the ethernet link.

20. The data network of claim 19, wherein the first ethernet port performs the downstream distribution of the downstream data via a signal in a downstream spectrum, and wherein the second ethernet port receives upstream transmission of the upstream data via a signal in an upstream spectrum.

* * * * *

UNITED STATES PATENT AND TRADEMARK OFFICE
CERTIFICATE OF CORRECTION

PATENT NO. : 10,050,801 B2
APPLICATION NO. : 14/611147
DATED : August 14, 2018
INVENTOR(S) : Salinger et al.

Page 1 of 1

It is certified that error appears in the above-identified patent and that said Letters Patent is hereby corrected as shown below:

In the Specification

Column 12, Detailed Description, Line 45:
Please delete "905" and insert --900--

Signed and Sealed this
Twenty-first Day of January, 2020

Andrei Iancu
*Director of the United States Patent and Trademark Office*